Jan. 29, 1957
A. D. RUTHERFORD, JR
2,779,696
METHOD OF CLEANING EXTRUDERS
Filed March 4, 1954
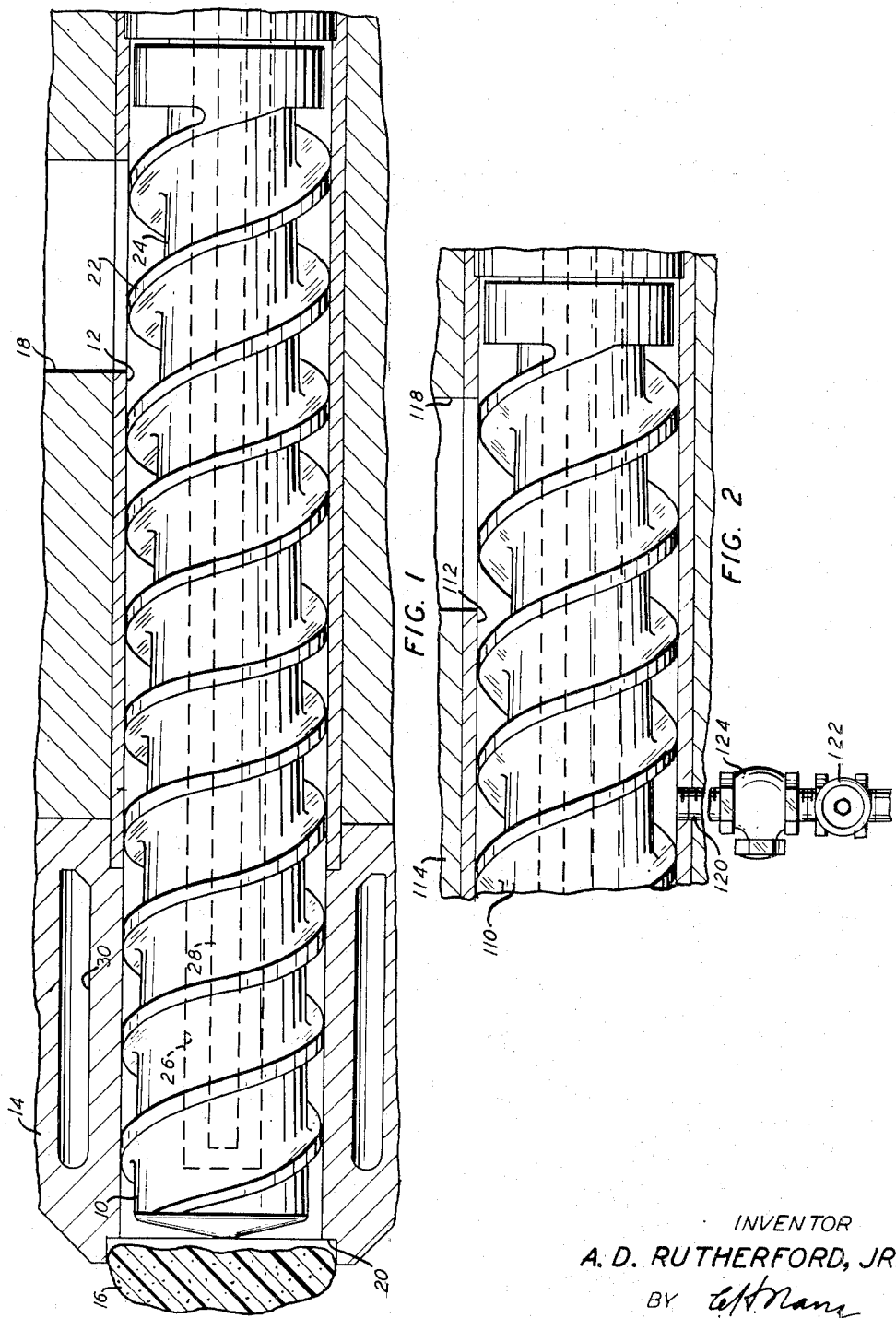
INVENTOR
A. D. RUTHERFORD, JR.
BY
ATTORNEY United States Patent Office 2,779,696
Patented Jan. 29, 1957

2,779,696
METHOD OF CLEANING EXTRUDERS

Albert D. Rutherford, Jr., Idlewylde, Md., assignor to Western Electric Company, Incorporated, New York, N. Y., a corporation of New York Application March 4, 1954, Serial No. 414,201

8 Claims. (Cl. 134—7)

This invention relates to methods of cleaning extruders, and more particularly to methods of removing undesirable deposits from the interior of plastic extruders.

In a manufacture of insulated electric conductors, a bare conductive wire, such as a copper-clad steel wire, is advanced continuously through a plastics extruder, which forms a coating of plastic insulation on the wire. This insulation may be composed of natural or synthetic rubber, polyvinyl chloride, polyethylene, or other similar dielectric compounds. The plastic compound is advanced through the extruder and towards the wire by a rotatable stock screw having one or more helical threads thereon.

From time to time it may become necessary to shut down the extruder to clean its interior walls and to clean the threads of the stock screw. Some plastic compounds may leave a deposit in the extruder, and in the course of time this deposit may accumulate to an undesirable extent. Solid polyethylene appears to give little difficulty in this respect. However, when the insulation is composed of cellular polyethylene, made by incorporating a powdered, heat decomposable blowing agent into the polyethylene being extruded, a particularly troublesome deposit appears in the extruder.

An object of this invention is to provide a new and improved method of cleaning plastic extruders.

Another object of the invention is to provide a new and improved method of removing undesirable deposits from the interior surfaces of plastic extruders.

A method illustrating certain features of the invention may include the steps of feeding a plastic compound and water to an extruder to be cleaned, and forcing through the extruder a sufficient quantity of the compound and the water to clean the interior thereof. The presence of a finely powdered form of a solid, heat decomposable blowing agent makes the mixture even more effective.

A complete understanding of the invention may be had from the following detailed description of a cleaning method embodying the invention, when considered in conjunction with the appended drawing, in which:

Fig. 1 is a vertical, longitudinal section of a portion of a typical extruder shown in the process of being cleaned, and Fig. 2 is a coresponding view of a portion of another extruder which is provided with an attachment to assist the cleaning operation.

Referring to Fig. 1, there is shown a portion of a typical extruder, including a stock screw 10 mounted rotatably within a cylindrical bore 12 formed within a housing 14. Power driven means (not shown) is provided to rotate the stock screw 10 to advance a plastic compound, such as a mass 16 thereof, from a feed hopper 18 to a discharge orifice 20. Under ordinary operating conditions, an extrusion die (not shown) and extrusion tools, such as a core tube (not shown), are mounted transversely across the bore 12 at the discharge orifice 20. In the present case this extruder is shown with the die and the tools removed while the extruder is being cleaned.

The stock screw 10 is provided with a helical thread 22 which extends continuously from the feed hopper 18 substantially to the discharge orifice 20. In the type of stock screw illustrated, the helical thread 22 forms a helical groove 24 characterized by a constant pitch but a gradually decreasing depth from the feed hopper 18 to the discharge orifice 20. This type of stock screw structure provides a vigorous working and plasticizing action of gradually increasing intensity as the plastic advances.

In order to control the temperature of the advancing plastic compound, the stock screw 10 is provided with a longitudinal interior bore 26 into which a pipe 28 extends for introducing water under pressure. Such water may be either hot or cold as needed to control the temperature along the stock screw 10, but cold water is usually needed to dissipate excess heat generated by the extrusion operation. In a similar manner, the housing 14 is provided with an annular cavity 30 through which a liquid temperature controlling medium may be flowed.

When a plastic compound which is susceptible to scorching is being extruded, a coating of charred material may be deposited on the surface of the stock screw 10 and on the wall of the bore 12. This is likely to happen in the extrusion of vinyl compounds, such as polyvinyl chloride, or polyethylene, used to insulate electrical conductors. The presence of the charred residues becomes evident as they occasionally break loose from the wall and from the stock screw, and gradually collect on the straining screens (not shown) mounted at the discharge orifice 20. Eventually, the straining screens may become clogged to such an extent that impairment of the efficiency of the extruder may result. In the event that very fine straining screens are absent, and only relatively coarse screens are used, particles of the charred residue may appear in the extruded insulation. It is possible for these particles to cause objectionable imperfections in the extruded insulation. Hence, care must be taken to prevent an excess of such charred residues from accumulating in the extruder.

Another instance in which it is necessary to clean an extruder, occurs in changing the color or the formula of the plastic being extruded. Of course, the use of a small amount of virgin plastic compound is helpful in purging the extruder in such cases, or special purging compositions may be employed. Such compositions are available in the commercial chemical market. A typical purging composition may contain a plastic vehicle compatible with the plastic being purged, an abrasive filler, and a lubricant. The effectiveness of such purging compositions usually depends upon a scouring action in which the composition frictionally rubs the interior walls of the extruder. At the same time, in flowing through the interior spaces of the extruder, the purging composition flushes out these spaces.

The commercially available polymers of ethylene employed as electrical insulation possess adequate stability under ordinary conditions, including the relatively high temperature and pressure conditions found in plastics extruders. This resistance to decomposition probably accounts for the fact that when polyethylene is extruded in the form of solid insulation, charred residues seldom appear. The molecular weight of these polymers ranges from about 4,000 up to about 38,000, and their melting or softening temperature is above about 100° C. and ranges up to about 200° C., depending upon their molecular weights.

In the production of cellular polyethylene by the use of certain powdered solid blowing agents, the creation of residues occurs frequently. One such blowing agent is dinitroso pentamethylene tetramine, which is also known by the trade name "Unicel ND." This blowing agent may be introduced into the polyethylene by pulverizing it and then dusting it onto small granules of the polyethylene prior to extrusion. Polyethylene is prepared commercially in the form of small solid granules for the special purpose of facilitating feeding it to extruders. Of course, other forms of polyethylene are also available, and the blowing agent could be introduced therein in other ways.

Other blowing agents could be used with varying degrees of success. For example, p-p'-oxy bis benzene sulfonyl hydrazide, known by the trade name "Celogen," is a useful blowing agent. Among the solid blowing agents, organic compounds are preferred, since they do not leave objectionable residues in the extruded insulation, which might adversely affect it dielectric qualties.

In the extrusion of a sheath of cellular polyethylene upon a filamentary conductive core, a blowing agent, such as a powdered form of dinitroso pentamethylene tetramine, may be uniformly distributed upon granules of the commercially available polymers of ethylene which are to be extruded. At the die a temperature of about 385° F. to about 450° F. is maintained to facilitate continuous extrusion of the polymer and to insure the formation of gas by decomposition of the blowing agent. Rotation of the stock screw advances the mixture and subjects it to a working action of gradually increasing intensity. The extrusion pressure builds up to about 3,000 to about 6,000 pounds per square inch. The extruded layer of insulation expands after leaving the extrusion die, due to the decomposition of the blowing agent, which forms minute, uniformly distributed, discrete, gas filled cells throughout the polyethylene sheath. The extruded product formed in this manner is characterized by uniformity in size, composition and electrical properties.

The dinitroso pentamethylene tetramine blowing agent decomposes within a narrow temperature range near 400° F. This decomposition temperature is sufficiently far above the temperature at which polyethylene softens to make it possible to use this blowing agent without danger of premature decomposition. The gas initially formed within the blown cells by the blowing agent is probably mostly nitrogen. However, as a result of slow diffusion in the course of time, it is likely that eventually the cells will be filled with air.

It has not been fully determined just what causes the residual deposits of charred material formed when expanded polyethylene is manufactured by the above-described methods. One possible source of these deposits is the antioxidant which is usually present in small amounts in the polyethylene, and is placed therein by the manufacturer of the polymer. The usual antioxidant is diphenyl paraphenylene diamine, which is also known by the trade names "JZF" and "DPPD." The charred residue may be due to decomposition of this antioxidant under the high temperatures and pressures existing in the extruder. It is also possible that the decomposition of the blowing agent may have some detrimental effect upon the antioxidant. On the other hand, the charred residue may be derived solely from the blowing agent.

According to another theory, in any localized high concentrations of the blowing agent in the polyethylene, hot spots may be created at the time the agent decomposes. In these hot spots there may be some free radicals derived from portions of the blowing agent molecule. The hot spots or the free radicals may promote oxidation or cross-linking of the polyethylene molecule, resulting in the formation of dense pellets of apparently gelled polyethylene, and possibly in carbonization of some of the polyethylene.

The deposit resulting from the extrusion of cellular polyethylene is more readily removable from the extruder if cleaning is undertaken immediately following the extrusion operation. If this is not done, and the deposit is allowed to remain in the extruder overnight, the deposit becomes quite firmly encrusted. It is then a more difficult undertaking to remove the deposit. Hence, it is advisable to clean the extruder at the end of each working day, as well as whenever cleaning may become necessary in the course of the day.

In the cleaning operation, the effectiveness of virgin plastic compound, as well as that of commercial purging compositions, is limited. Fresh and light deposits can be removed by such means. However, the firmly encrusted deposits created when the extruder is allowed to remain uncleaned overnight are more stubborn. In any event, eventually a hard, black crust builds up on the interior surfaces of the extruder, and this crust cannot be dislodged by ordinary methods. In the past it has been generally necessary to resort to the use of brushes.

The job of disassembling and brushing a standard commerical extruder requires about two hours. A rotary brush mounted on a long shaft powered by an electric motor can be applied to the cylindrical interior walls of the extruder. For the helical threads of the stock screw, the power driven rotary brush does not work so well as a straight brush applied manually with vigorous back and forth strokes.

In accordance with the present invention, the extruder can be cleaned without disassembling it, merely by introducing and extruding a mixture of water and a granular form of a plastic compound, such as polyethylene or polyvinyl chloride. Polyethylene is preferred because of its higher melting point. The effectiveness of this mixture is greatly enhanced by the addition of about 1% to about 10% by weight of a finely powdered form of a solid, heat decomposable blowing agent. Dinitroso pentamethylene tetramine is the preferred blowing agent. Only about 5 to about 10 pounds of the wet mixture are required to clean an extruder having a stock screw 3 inches in diameter. More or less of the mixture may be required depending upon the size of the extruder and how firmly encrusted the deposit is.

The simplest manner in which such cleaning can be accomplished in actual practice, is by repeatedly grasping a handful of granular plastic, such as polyethylene, on which the powdered blowing agent, such as dinitroso pentamethylene tetramine, has previously been dusted uniformly, dipping this handful into a bucket of water to wet it, and throwing the wet mixture into the feed hopper of the extruder. Extrusion of a few pounds of this mixture at temperatures approximating ordinary operating temperatures of about 430° F., results in a thorough cleaning of the extruder.

Of course, the mixture could be formulated in other ways. For example, instead of dipping the dusted granules of plastic into the bucket of water, the water could be sprayed on. The water could also be sprayed into the feed hopper or the extrusion bore of the extruder when the blowing agent and the plastic compound are already present therein.

Fig. 2 illustrates a portion of an extruder which is similar to the previously described extruder shown in Fig. 1, but is provided with an attachment for introducing water or steam directly into the extrusion bore thereof. This extruder comprises a stock screw 110 mounted rotatably within a cylindrical extrusion bore 112 formed within a housing 114. Power driven means (not shown) is provided to rotate the stock screw 110 to extrude a mass (not shown) of a plastic compound introduced through a feed hoper 118.

Through an inlet pipe 120, either water or steam under pressure can be introduced directly into the interior of the extrusion bore 112 at a point slightly beyond the feed hopper 118. The pipe 120 is provided with a control valve 122 to regulate the amount of water admitted, and a check valve 124 to prevent plastic material from entering the pipe 120. In using this equipment to clean the extruder, a dry mixture of granules of plastic dusted with a suitable powdered blowing agent would be fed into the feed hopper 118, and the water or steam required would be admitted through the inlet pipe 120 in the desired quantity by regulating the control valve 122.

By any of the methods embodying the invention, in a matter of a very few minutes, the charred scale is dislodged from the interior walls of the extruder and is flushed out. In fact, it was found that such methods of cleaning are much more effective than any commercial purging composition tried. Although every last speck of charred material may not be removed by methods embodying the invention, for all practical purposes the extruder is sufficiently cleaned. The extrusion die and any other conventional extrusion tools, such as a core tube and a core tube holder, can remain secured to the discharge end of the extruder, and be cleaned at the same time. However, the usual practice is to remove the die and the tools in order to permit observation of the interior of the extruder, and thereby to allow the operator to see how the cleaning is progressing.

As might be expected, such methods are more effective in cleaning the delivery end of the stock screw than in cleaning the entrance end thereof near the feed hopper. However, the entrance end of the screw seldom receives a heavy deposit. The reason for this situation is probably due to the fact that under extrusion conditions both the pressure and the temperature are low in the vicinity of the entrance end of the stock screw. As the plastic is advanced along the stock screw towards the delivery end thereof, the pressure and the temperature increase gradually, until conditions conducive to the formation of encrusted deposits occur. Hence, methods embodying the invention are most effective where they are most needed.

It is advisable to rotate the stock screw at a slower speed during cleaning than during a normal production operation. The normal operating speed of a 3 inch diameter screw is about 40 to 60 revolutions per minute. This same screw should be operated at from about 5 to about 20 revolutions per minute during cleaning operations performed in accordance with the invention.

The exact manner in which the claimed methods operate to clean extruders is not entirely understood. It is possible that particles of the blowing agent may be forced into and beneath the layer of charred material on the stock screw and walls of the extruder. At the high temperatures existing in the extruder, these particles of blowing agent decompose and generate gas, which may tend to dislodge flakes of the charred deposit. At the same time, the water is converted into steam, which results in the creation of more gas under pressure, having the same effect as the gas generated by the blowing agent. Meanwhile, the granules of plastic compound, which are mixed with the blowing agent and the water, provide frictional resistance which increases the pressure, and simultaneously they scour all interior surfaces in the extruder.

It is known that granules of the plastic compound alone would have at least some cleaning action in the extruder. Practically any other solid compound which would provide bulk and frictional resistance to flow would likewise have a similar cleaning action. However, granules have been found to be more effective than powder or any other physical form of the plastic compound. The addition of the blowing agent is probably helpful since it creates gas under pressure in highly localized areas inside the extruder, and this probably pries loose flakes of the charred deposit. The water probably cleans in a similar fashion, and the addition of the water assists the cleaning action even if the blowing agent is absent. However, it is believed that the combined action of the blowing agent and the water with the plastic granules is more effective than would be any of these ingredients either singly or any pair of them. Furthermore, together these three ingredients have a synergistic action. This is to say, their combined action is more effective than the summation of their individual actions. Further theorizing, it is possible that the water has a catalytic effect upon the decomposition of the blowing agent, and this may render their cleaning action more effective.

Another credible explanation of the cleaning action, is that the vaporization of the water extracts so much heat from the encrusted deposit, that the deposit shrinks momentarily an extent sufficient to develop cracks. Then the particles of the blowing agent, and perhaps the gas under pressure generated by the blowing agent and by vaporization of the water, seep into the cracks and pry loose flakes of the deposit. Again, the bulk and the frictional resistance offered by the plastic granules assist in rubbing the surfaces being cleaned. This explanation points to the valuable effect of the water, whether or not the blowing agent is present, but which is enhanced by the presence of the blowing agent.

The inclusion of water as one of the ingredients of the cleaning composition is a radical departure from prior practice. Heretofore, it has been considered highly undesirable to have water present in an extrusion chamber. In fact, it is customary to safeguard against the presence of water during the extrusion operation. Care has been exercised to see that the plastic granules are dry before they are fed into the extruder. Of course, these measures are still necessary for a production extrusion operation. However, for cleaning purposes, when employed in conjunction with the plastic granules, the water has been found to be highly beneficial, especially when some of the powdered blowing agent is present.

The usefulness of methods embodying the invention is not limited to cleaning extruders which have been used to produce cellular polyethylene. Deposits resulting from the extrusion of solid plastics, such as solid polyethylene and solid polyvinyl chloride, have been removed successfully in accordance with the invention. However, ordinarily it is unnecessary to resort to such methods to clean extruders which have been used to produce solid insulation. The primary usefulness of the invention is in cleaning extruders which contain encrusted deposits resulting from the extrusion of cellular plastics, and especially deposits resulting from the use of the blowing agent dinitroso pentamethylene tetramine to extrude expanded polyethylene.

What is claimed is:

1. The method of cleaning the interior of plastics extruders, which comprises introducing into such an extruder water and a granular plastic compound selected from the group consisting of polyvinyl chloride and polyethylene, forcing through the extruder a sufficient quantity of the plastic compound and the water to clean the interior thereof, and maintaining the extruder at such a temperature that the plastic forced therethrough is in extrudable condition and the water is converted into steam.

2. The method of cleaning the interior of plastics extruders, which comprises feeding to such an extruder a water wet mixture of a granular plastic compound selected from the group consisting of polyvinyl chloride and polyethylene and a powdered, organic, heat decomposable blowing agent, forcing through the extruder a sufficient quantity of the wet mixture to clean the interior thereof, and maintaining the extruder at a temperature high enough to cause the plastic to be extrudable, the water to be converted into steam and the blowing agent to be decomposed.

3. The method of removing undesirable residues and cleaning plastics extruders, which comprises applying water to the surface of a mixture of a granular plastic compound selected from the group consisting of polyvinyl chloride and polyethylene and a powdered, organic, heat decomposable blowing agent, forcing the wet mixture through the extruder at temperatures sufficiently high to soften the plastic compound, convert the water into steam and decompose the blowing agent, whereby the interior of the extruder is cleaned.

4. The method of removing undesirable residues and cleaning plastics extruders, which comprises introducing a granular plastic compound selected from the group consisting of polyvinyl chloride and polyethylene into such an extruder, simultaneously introducing water into the extruder, forcing through the extruder a sufficient quantity of the plastic compound and the water to clean the interior of the extruder, and maintaining the extruder at such a temperature that the plastic forced therethrough is in extrudable condition and the water is converted into steam.

5. The method of removing undesirable residues and cleaning plastics extruders, which comprises introducing into such an extruder a dry mixture of granules of a plastic compound selected from the group consisting of polyvinyl chloride and polyethylene and a powdered, organic, heat decomposable blowing agent, simultaneously injecting water into the interior of the extruder, forcing through the extruder a sufficient quantity of the plastic compound, the blowing agent and the water to clean the interior of the extruder, and maintaining the extruder at a temperature high enough to cause the plastic to be extrudable, the water to be converted into steam and the blowing agent to be decomposed.

6. The method of removing undesirable residues and cleaning plastics extruders, which comprises introducing into such an extruder a dry mixture of granules of a plastic compound selected from the group consisting of polyvinyl chloride and polyethylene and a powdered, organic, heat decomposable blowing agent, simultaneously injecting steam into the interior of the extruder, forcing through the extruder a sufficient quantity of the plastic compound, the blowing agent and the steam to clean the interior of the extruder, and maintaining the extruder at a temperature high enough to cause the plastic to be extrudable and the blowing agent to be decomposed.

7. The method of cleaning and removing undesirable deposits from the interior surfaces of plastics extruders, which comprises uniformly distributing a finely powdered, organic, heat decomposable blowing agent onto granules of a plastic compound selected from the group consisting of polyvinyl chloride and polyethylene, wetting the surface of this mixture with water, feeding the wet mixture to an extruder to be cleaned, maintaining the extruder at a temperature above the melting point of the plastic compound, above the boiling point of the water and above the decomposition temperature of the blowing agent, and forcing through the extruder a quantity of the wet mixture sufficient to clean the interior surfaces thereof.

8. The method of cleaning the interior of extruders containing carbonaceous deposits which have been formed by extruding mixtures of polyethylene and a solid, organic, heat decomposable blowing agent, which comprises uniformly distributing about 1% to about 10% by weight of a powdered form of such a blowing agent onto granules of polyethylene, applying sufficient water to this mixture to wet its surface, feeding the wet mixture into an extruder to be cleaned, maintaining the extruder at a temperature above the melting point of the polyethylene granules and above the decomposition temperature of the blowing agent, and forcing through the extruder a quantity of the mixture sufficient to flush out the interior of the extruder and clean the interior surfaces thereof.

No references cited.